May 13, 1924.
E. HIGGINS
LATHE
Filed Jan. 22, 1921
1,493,980
6 Sheets-Sheet 6
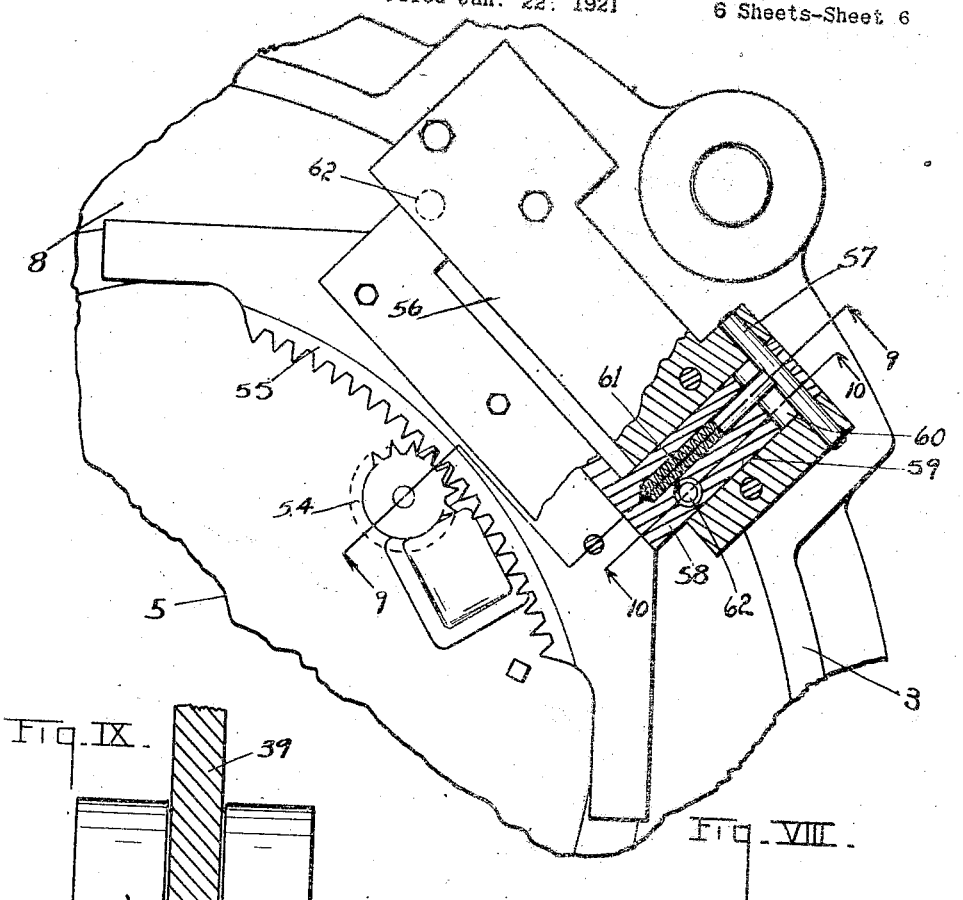
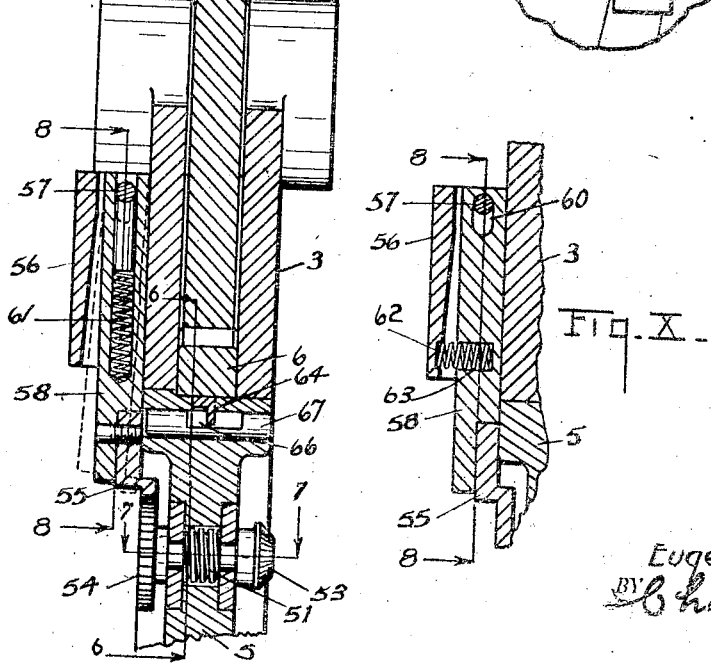
INVENTOR.
Eugene Higgins
BY Chappell & Earl
ATTORNEYS.

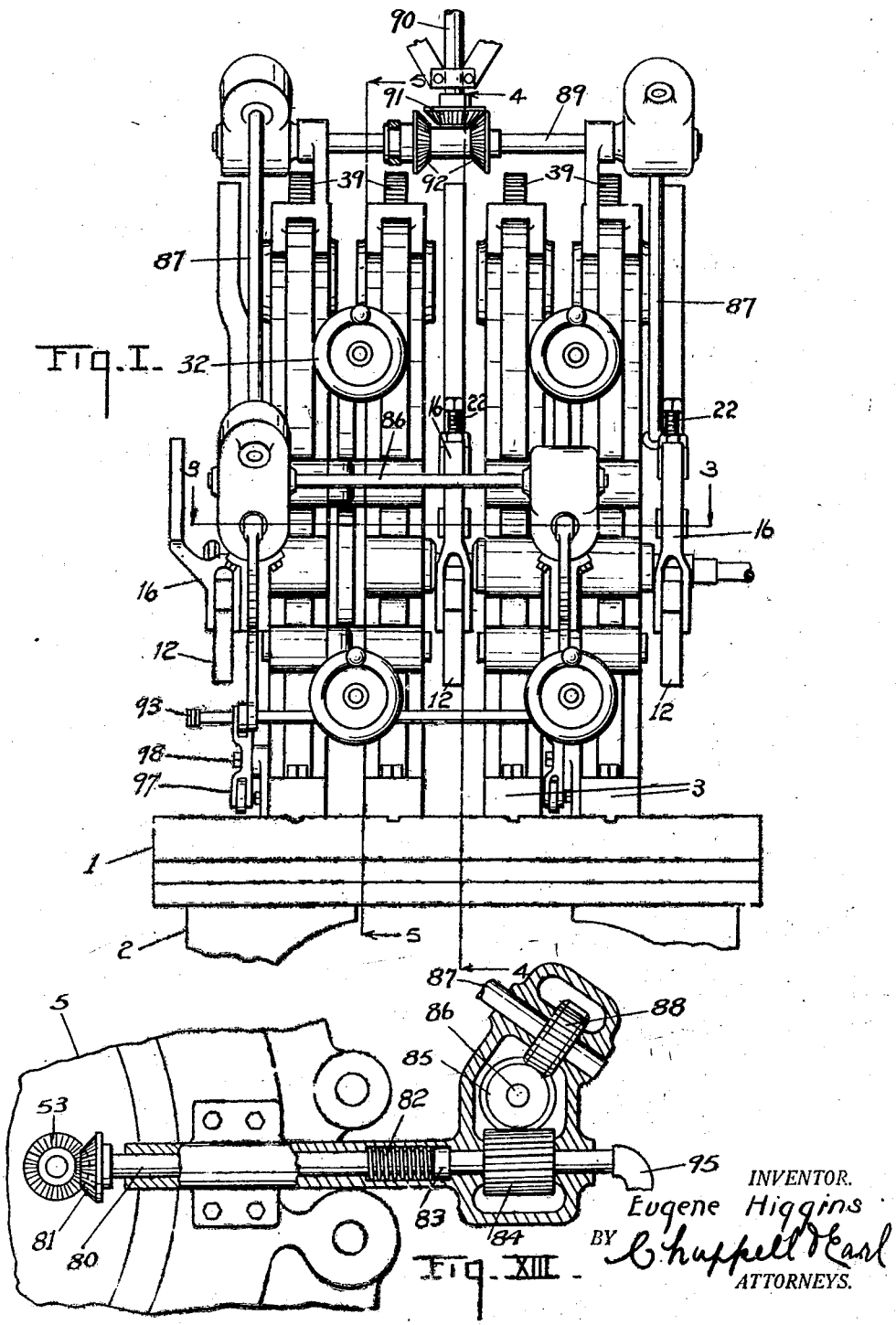

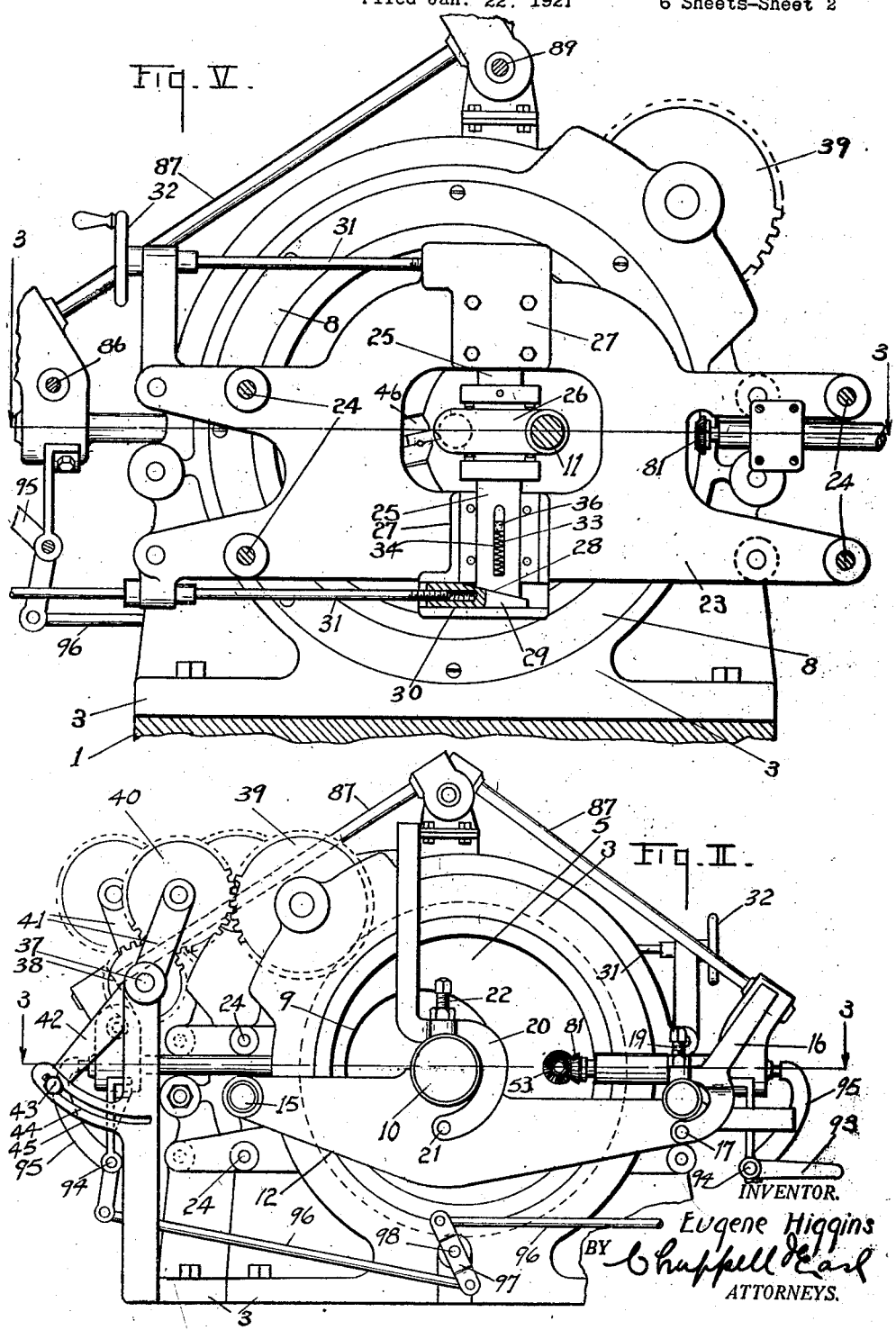

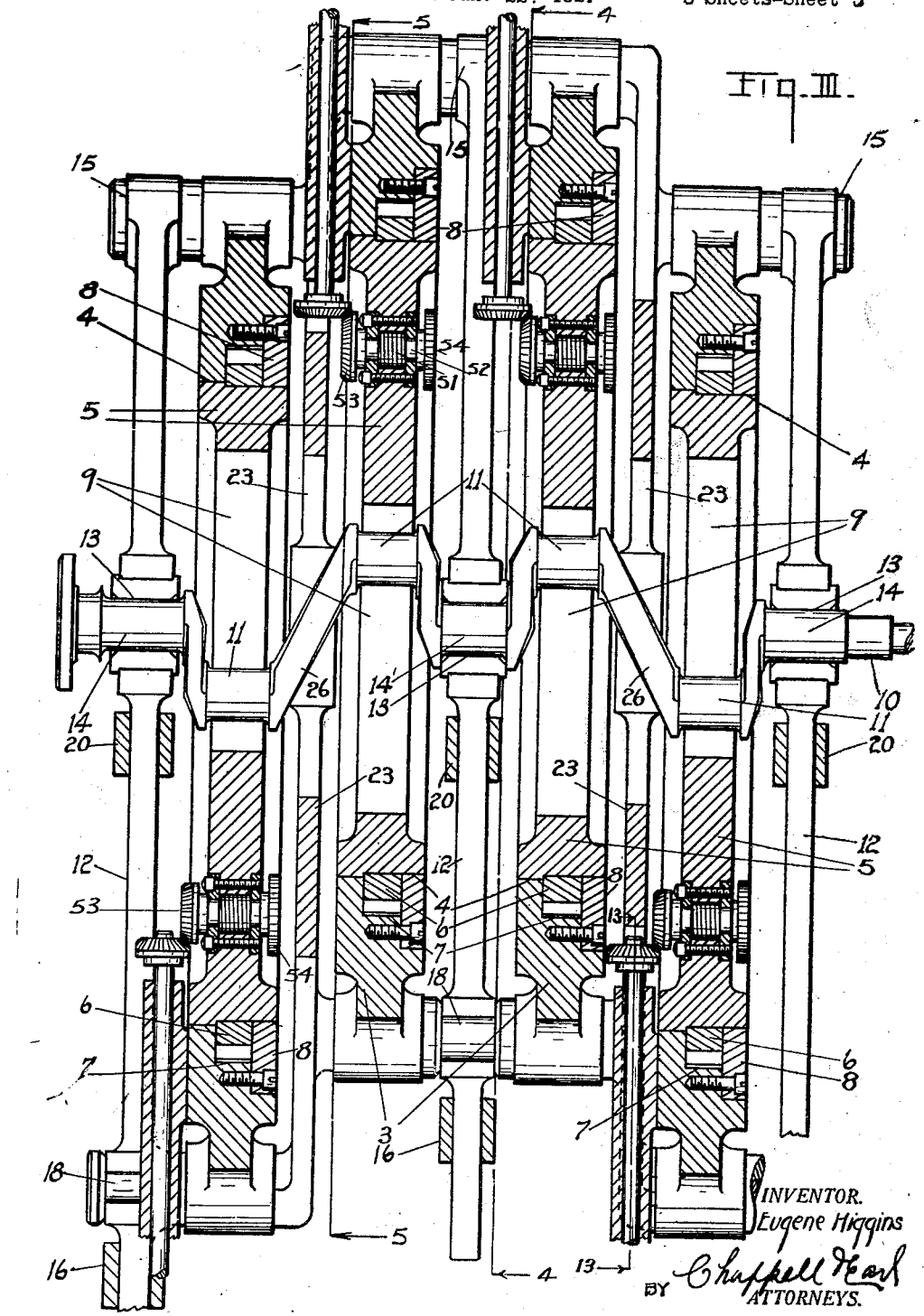

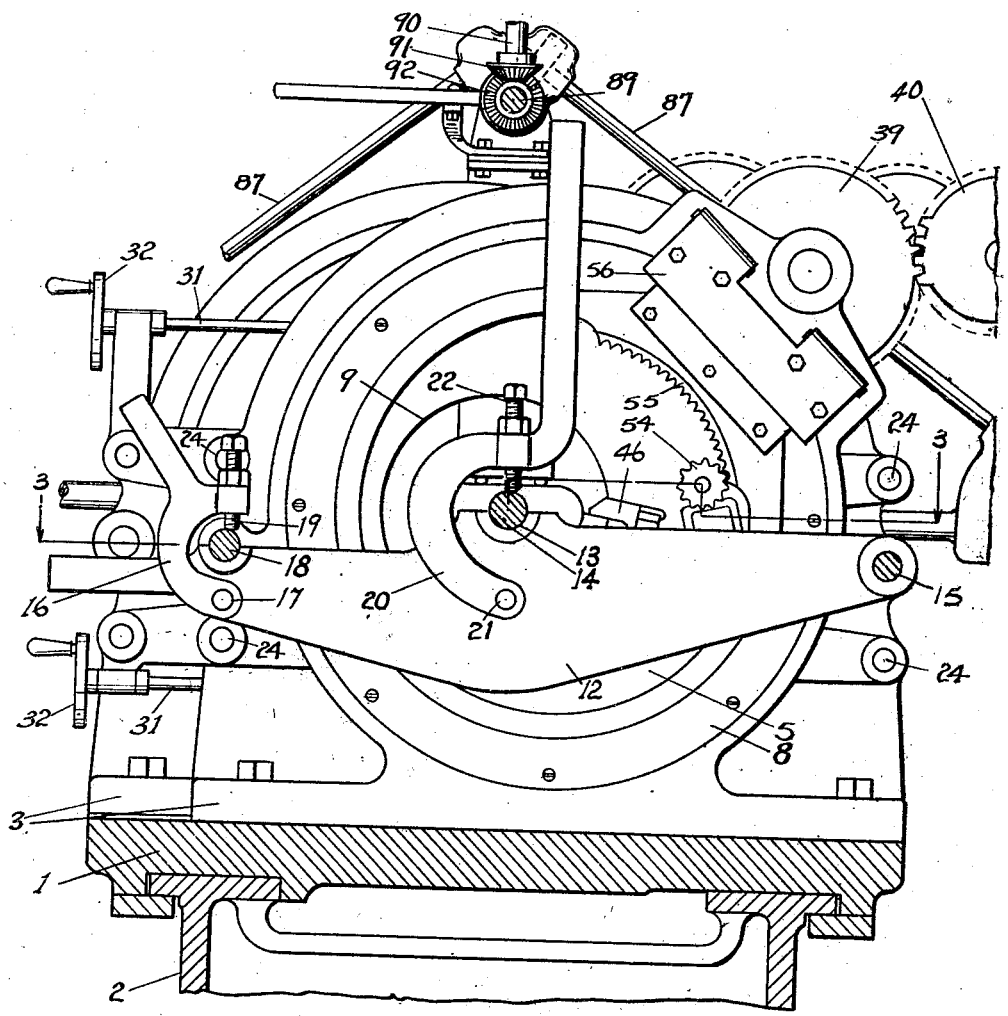

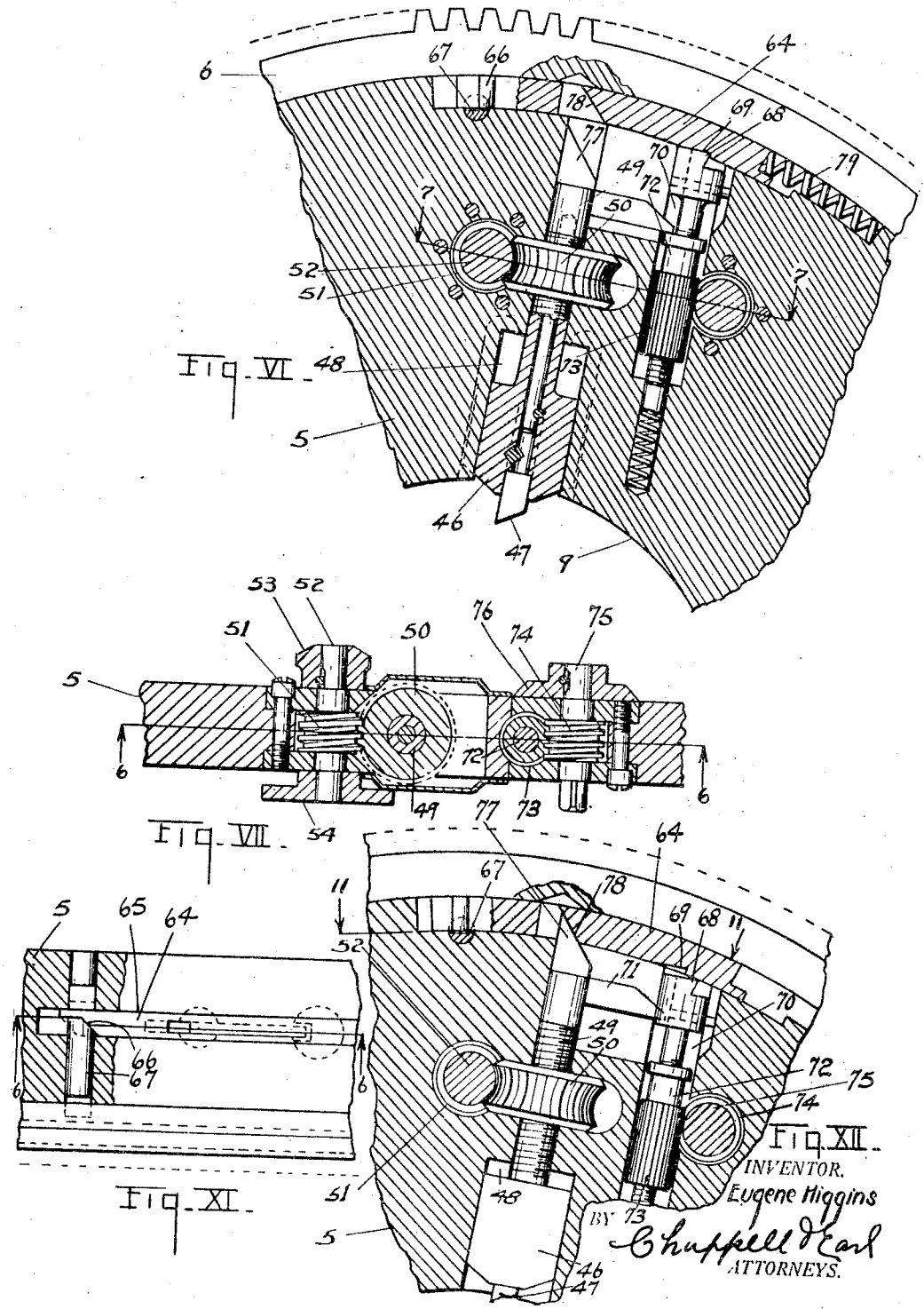

Patented May 13, 1924.

1,493,980

UNITED STATES PATENT OFFICE.

EUGENE HIGGINS, OF JACKSON, MICHIGAN.

LATHE.

Application filed January 22, 1921. Serial No. 439,122.

*To all whom it may concern:*

Be it known that I, EUGENE HIGGINS, a citizen of the United States, residing at the city and county of Jackson and State of Michigan, have invented certain new and useful Improvements in Lathes, of which the following is a specification.

This invention relates to improvements in lathes.

The main objects of this invention are:—

First. To provide an improved lathe adapted for the turning of the crank pins of a crank shaft.

Second. To provide an improved lathe with which the several crank pins of a multi-throw crank shaft may be accurately and rapidly turned at the same time.

Third. To provide an improved lathe embodying these advantages which is of large capacity.

Fourth. To provide an improved lathe for the turning of crank pins of crank shafts which is automatic in operation.

Further objects, and objects relating to structural details, will definitely appear from the detailed description to follow.

I accomplish the objects of my invention by the devices and means described in the following specifications. The invention is clearly defined and pointed out in the claims.

A structure which is a preferred embodiment of my invention is clearly illustrated in the accompanying drawing forming a part of this specification, in which:

Fig. I is a front elevation of a lathe embodying the features of my invention, parts of the frame and shafting being broken away.

Fig. II is a side view looking from the left of Fig. I with the bed of the machine omitted and other parts broken away.

Fig. III is a horizontal detail section on a line corresponding to line 3—3 of Figs. I, IV and V, the work and certain parts of the machine being shown in full lines.

Fig. IV is a detail vertical section from front to rear on a line corresponding to line 4—4 of Figs. I and III.

Fig. V is a detail vertical section from front to rear on a line corresponding to line 5—5 of Figs. I and III.

Fig. VI is an enlarged detail section on a line corresponding to line 6—6 of Figs. VII, IX and XI, showing details of the tool feed means.

Fig. VII is a detail section on a line corresponding to line 7—7 of Figs. VI and IX, showing further details of the tool feed means.

Fig. VIII is a detail side elevation of one of the units showing further details of the tool feed means, partially in section on a line corresponding to line 8—8 of Figs. IX and X.

Fig. IX is a detail section on a line corresponding to the broken line 9—9 of Fig. VIII.

Fig. X is a detail section on a line corresponding to line 10—10 of Fig. VIII.

Fig. XI is a detail section on a line corresponding to line 11—11 of Fig. XII.

Fig. XII is a detail section corresponding to Fig. VI, showing the tool holder on its return movement, the tool holder feed control having been tripped.

Fig. XIII is a detail view partially in section, showing further details of the tool control means particularly of the return means therefor.

In the drawing similar reference characters refer to similar parts throughout the several views, and the sectional views are taken looking in the direction of the little arrows at the ends of the section lines.

Referring to the drawing, 1 represents the bed of the machine which is supported on suitable pedestals 2 to support the operative parts at proper height for the operator. On this bed I mount a series of units, there being a unit for each crank pin to be turned. That is, if the machine is designed for the manufacture or turning of the crank pins of four-throw cranks, four units are provided; if for a six-throw crank shaft, six units are provided.

These units comprise unit frame members 3 having annular ways or bearings 4 for the disk-like cutter heads 5 which are rotatably supported thereby.

These cutter heads are provided with peripheral gears 6 and the frame members are provided with annular recesses 7 to receive the gears, one wall 8 of each recess being removable for the assembling of the parts. The cutter heads are provided with openings 9 through which the work 10 as shown in Fig. III may be introduced, so that the cutter heads revolve around the work to turn the crank pins 11 thereof. Owing to the crank pins being offset relative to each other, it is necessary to arrange the units so that the axial centers of their cutter heads correspond with the axial center of the crank pin upon which they operate.

The work or crank shaft 10 to be operated upon is supported by the work holders 12, having seats 13 adapted to receive the bearings of the crank shaft, the crank shaft illustrated being provided with three bearings, that is, end bearings 14 and center bearing 14', there being three of the work holders. The work holders are pivoted at their rear ends as at 15—see Figs. III and IV—so that they may be dropped down to permit the introduction of the work, the front ends of these work holders are supported by the latches 16 pivoted on the work holders at 17 and adapted to swing over keepers 18 on the unit frames. These latches have adjustable keeper engaging screws 19, the screw engaging portions being provided to take up any lost motion and wear, so that when the latch is engaged, the work supports are rigidly held in operative position.

The work clamps 20 are in the form of yoke-like levers pivoted at 21 upon the work holders, and having work engaging screws adapted to swing over the top of the work and clamp the work onto the seats 13. To prevent rotative movement of the work, it is further supported by cross members 23 arranged between the unit frame members, the cross members being carried by rods 24 at their ends—see Figs. III and V.

These cross members carry clamps 25 disposed in opposed pairs and adapted to engage the cheek pieces 26 of the work. These clamps 25 are slidably supported in oppositely arranged brackets 27 on the cross members 23—see Fig. V—and have beveled outer ends 28 with which the tapered actuating members 29 coact. These actuating members are arranged in slideways 30 in the outer ends of the slide brackets 27. The actuating wedges 29 are operated by means of the screws 31 having hand wheels 32 at the front of the machine.

The clamps 25 are retracted by means of the springs 33, supported in slots 34 in the clamp 25 with their upper ends supported by pins 36 on the slide brackets, their lower ends being supported by the clamps so that when the clamps are actuated to clamping position the springs are compressed and when the actuating wedges 29 are retracted the springs retract the work holder clamps 25.

With this arrangement the work is held very rigidly with the crank pins in centered relation to the cutter heads of the several units and the work may be quickly and easily introduced and secured in the machine and also quickly released.

The cutter heads are driven from the shaft 37 disposed across the rear of the machine and provided with gears 38 connected to the gears 39 which mesh with the gears 6 on the cutter heads by means of the gears 40. These gears 40 are carried by arms 41 pivoted on the shaft 37 so that they may be adjusted to accommodate the offset relation of the units. To secure the gears 40 in operative position the arms 42 are provided with clamping screws 43 engaging the segmental slots 44 in the bracket projections 45 on the frame. This driving arrangement is largely a matter of convenience in the manufacture and assembling of the units in the machine. The driving means for the shaft 37 is not illustrated, as any suitable driving means may be provided.

The cutter heads support the tool holders 46, so that the tools 47 carried thereby project into the center opening 9 of the cutter heads into coacting relation with the work revolving around the same with the cutter head. The tools 47 are supported in ways 48. The tool holders are provided with shanks 49 having worm gears 50 threaded thereon, so that as the gears are rotated the tool holders are advanced or retracted. Coacting worms 51 are mounted on the feed spindles 52 disposed transversely through the cutter heads, and having beveled gears 53 on one end and the tooth gears 54 on the other—see Figs. III, VI and VII.

The spindle 52 is actuated to advance the tool holders with each revolution of the cutter heads by means of the feed segments 55 which are mounted on the cutter head frame members 3, so as to engage the pinions 54 as the cutter heads revolve driving the spindles 52 and through the connections described the worm gears threaded upon the shanks of the tool holders, thereby advancing the tool holder.

Means are provided by means of which the feed of the tool holders may be stopped at a predetermined point. To accomplish this the feed segments 55 are mounted on the supports 56 which are hinged at 57 on the frames 3, so as to swing outwardly, bringing the segments out of engaging position. The segments are also yieldingly mounted on these supports by means of the arms 58 engaging slots 59 in the supports 56, the arms being slotted at 60 to engage the hinge pins 57, thereby providing for a limited movement of the segments, the segments being held yieldingly downward by the coiled spring 61—see Figs. VIII and IX. This allows for the yielding of the segment in the event of the pinions or the racks becoming clogged by cuttings or the like and also prevents breakage in the event that the teeth should not engage properly when the pinions pass on to the segments.

The segments are held yieldingly inward by means of the springs 62 disposed in recesses 63 provided therefor in the segment supports—see Figs. VIII and X. Each cutter head is provided with a trip actuating slide 64 arranged in a suitable slideway 65 and having a cam 66 engaging the segment actuating pin 67 arranged transversely through the cutter head to coact with the segment support, so that by the lateral projection of the pin the segment is swung out of engaging position as is shown by dotted lines in Fig. IX. The actuating slide is provided with a detent 68 adapted to engage the keeper 69 on the actuating slide 64. This detent is slidingly supported in a bore-like recess 70 in the cutter head, the detent being arranged parallel to the shank of the tool holder so as to be engaged by the finger 71 on the tool holder when the tool holder reaches a predetermined point in its feeding movement. The detent is provided with an adjustable tappet 72 with which the finger engages.

This tappet 72 is threaded upon the detent and is provided with a pinion 73 meshing with the worm 74 on the spindle 75 having an index dial 76, and adapted to receive a wrench so that tappet 72 may be adjusted to determine the inward and feeding limit of the tool holder. To return the actuating slide 64 to its initial position the shank of the tool holder is provided with a beveled end 77 adapted to coact with the beveled surface 78 on the slide 64, thereby moving the slide rearwardly against the tension of its actuated spring 79 and to a position to be engaged by its detent 68. By this arrangement of parts the feeding of the tool may be stopped at any desired point.

To return or retract the tool holders, I provide shafts 80 having beveled pinions 81 adapted to be brought into mesh with the beveled pinions 53 of the feed spindles 52. The pinions 81 are normally out of mesh with gears 53. Shafts 80 are supported for longitudinal movement and are held yieldingly in retracted position by the springs 82 engaging the collars 83 on the shaft—see Fig. XIII. The shafts 80 are provided with elongated pinions 84 which mesh with gears 85 on the shaft 86, there being one of these shafts 86 at the front and one at the rear of the machine. The shaft 86 is driven from the shaft 87, being connected thereto by the pinion 88 and the gear 85. The shaft 87 is geared to the shaft 89 which is in turn driven from the power shaft 90 having a beveled gear 91 with which the beveled gears 92 on the shaft 89 may be engaged, the gears 92 being arranged facing so that the shaft 89 may be driven in either direction. The shafts 80 are shifted to engage the pinions by means of the lever 93 on one of the rock shafts 94, which are provided with arms 95 engaging the ends of the shafts 80. These rock shafts are connected by the links 96 pivoted at 98, one link being connected at each side of the pivot so that upon the operation of the lever the arms 95 are actuated in the same direction to engage the pinions 81. With this arrangement the tool holders are rapidly returned, or if desired they may be rapidly advanced to the work.

With this arrangement of parts the several crank pins of the crank shaft may be simultaneously and accurately turned, the operations being largely automatic and the work very accurate. The work is quickly and easily placed in the machine or removed therefrom.

I have illustrated and described my improvements in only one embodiment, as I believe the disclosures made will enable those who practice my invention to embody and adapt the same as particular conditions may require. While my improved lathe is especially designed by me for the turning of crank pins of a crank shaft, certain features are readily adapted and desirable for use in other relations.

Having thus described my invention, what I claim as new and desire to secure by Letters Patent is:

1. In a structure of the class described, the combination of a cutter head frame member provided with an annular cutter head bearing, a disk-like cutter head rotatable in said bearing and having a peripheral gear and a central opening through which the work may be disposed and a radial tool holder way, a tool holder movable in said way and provided with a shank having a worm gear threaded thereon, a feed spindle disposed on said cutter head transversely of said shank and provided with a worm meshing with said gear on said shank and with a feed pinion at one end and a beveled return gear at the other, a feed segment mounted on said frame member to move into and out of position to engage said feed pinion as the cutter head revolves, a shifting means for said feed segment, comprising a pin disposed transversely on said cutter head to engage said feed segment and tripping slide mounted on said cutter head and provided with a cam coacting with said pin, an actuating spring for said slide, a spring actuated detent for said slide provided with an adjustable tappet, said shank being provided with a finger coacting with said tappet, means for adjusting the tappet on said detent whereby the tripping point of the feed may be adjusted, means for returning said tool holder comprising a longitudinally movable shaft provided with a gear adapted to be brought into engagement with said return gear on said feed spindle, said tool holder shank being provided with an inclined end adapted to engage said slide whereby the slide is returned upon the return of the tool holder, and means for driving said cutter head comprising a gear meshing with said peripheral gear of said cutter head.

2. In a structure of the class described, the combination of a cutter head frame member provided with an annular cutter head bearing, a disk-like cutter head rotatable in said bearing and having a peripheral gear and a central opening through which the work may be disposed and a radial tool holder way, a tool holder movable in said way and provided with a shank having a worm gear threaded thereon, a feed spindle disposed on said cutter head transversely of said shank and provided with a worm meshing with said gear on said shank and with a feed pinion, a feed segment mounted on said frame member to move into and out of position to engage said feed pinion as the cutter head revolves, a shifting means for said feed segment, comprising a pin disposed transversely on said cutter head to engage said feed segment and tripping slide mounted on said cutter head and provided with a cam coacting with said pin, an actuating spring for said slide, a spring actuated detent for said slide provided with an adjustable tappet, said shank being provided with a finger coacting with said tappet, means for adjusting the tappet on said detent whereby the tripping point of the feed may be adjusted, means for returning said tool holder, and means for driving said cutter head comprising a gear meshing with said peripheral gear of said cutter head.

3. In a structure of the class described the combination of a cutter head frame member provided with an annular cutter head bearing, a disk-like cutter head rotatable in said bearing and having a peripheral gear and a central opening through which the work may be disposed and a radial tool holder way, a tool holder movable in said way and provided with a shank having a worm gear threaded thereon, a feed spindle disposed on said cutter head transversely of said shank and provided with a worm meshing with said gear on said shank and with a feed pinion at one end and a beveled return gear at the other, a feed segment mounted on said frame member to move into and out of position to engage said feed pinion as the cutter head revolves, a shifting means for said feed segment, comprising a pin disposed transversely on said cutter head to engage said feed segment and tripping slide mounted on said cutter head and provided with a cam coacting with said pin, an actuating spring for said slide, a spring actuated detent for said slide, said shank being provided with a finger coacting with said detent, means for returning said tool holder comprising a longitudinally movable shaft provided with a gear adapted to be brought into engagement with said return gear on said feed spindle, said tool holder shank being provided with an inclined end adapted to engage said slide whereby the slide is returned upon the return of the tool holder, and means for driving said cutter head comprising a gear meshing with said peripheral gear of said cutter head.

4. In a structure of the class described, the combination of a cutter head frame member provided with an annular cutter head bearing, a disk-like cutter head rotatable in said bearing and having a peripheral gear and a central opening through which the work may be disposed and a radial tool holder way, a tool holder movable in said way and provided with a shank having a worm gear threaded thereon, a feed spindle disposed on said cutter head transversely of said shank and provided with a worm meshing with said gear on said shank and with a feed pinion, a feed segment mounted on said frame member to move into and out of position to engage said feed pinion as the cutter head revolves, a shifting means for said feed segment comprising a pin disposed transversely on said cutter head to engage said feed segment and tripping slide mounted on said cutter head and provided with a cam coacting with said pin, an actuating spring for said slide, a spring actuated detent for said slide, said shank being provided with a finger coacting with said detent, means for returning said tool holder, and means for driving said cutter head comprising a gear meshing with said peripheral gear of said cutter head.

5. In a structure of the class described, the combination of an annular rotatably mounted cutter head, driving means for said cutter head, a tool holder mounted on said cutter head for feeding movement and provided with a feed screw having a worm gear threaded thereon, a feed spindle disposed on said cutter head transversely of said feed screw and provided with a worm meshing with said gear on said feed screw and with a feed pinion at one end and a return gear at the other, a feed segment mounted on said frame member to move into and out of position to engage said feed pinion as the cutter head revolves, a shifting means for said feed segment, comprising a tripping member mounted on said cutter head, an actuating spring for said tripping member, a detent for said tripping member provided with an adjustable tappet, said feed screw being adapted to engage said tappet, means for adjusting the tappet on said detent whereby the tripping point of the feed may be adjusted, and means for returning said tool holder comprising a gear adapted to be brought into engagement with said return gear on said feed spindle, said tool holder being provided with means whereby the tripping member is returned to its initial position upon the return of the tool holder.

6. In a structure of the class described, the combination of an annular rotatably mounted cutter head, driving means for said cutter head, a tool holder mounted on said cutter head for feeding movement and provided with a feed screw having a worm gear threaded thereon, a feed spindle disposed on said cutter head transversely of said feed screw and provided with a worm meshing with said gear on said feed screw and with a feed pinion at one end and a return gear at the other, a feed segment mounted on said frame member to move into and out of position to engage said feed pinion as the cutter head revolves, a shifting means for said feed segment, comprising a tripping member mounted on said cutter head, an actuating spring for said tripping member, a detent for said tripping member, said feed screw being adapted to engage said detent, and means for returning said tool holder comprising a gear adapted to be brought into engagement with said return gear on said feed spindle, said tool holder being provided with means whereby the tripping member is returned to its initial position upon the return of the tool holder.

7. In a structure of the class described, the combination of an annular rotatably mounted cutter head, driving means for said cutter head, a tool holder mounted on said cutter head for feeding movement and provided with a feed screw having a worm gear threaded thereon, a feed spindle disposed on said cutter head transversely of said feed screw and provided with a worm meshing with said gear on said feed screw and with a feed pinion at one end and a return gear at the other, a feed segment mounted on said frame member to move into and out of position to engage said feed pinion as the cutter head revolves, a shifting means for said feed segment, comprising a tripping member mounted on said cutter head, a detent for said tripping member provided with an adjustable tappet, said feed screw being adapted to engage said tappet, means for adjusting the tappet on said detent whereby the tripping point of the feed may be adjusted, and means for returning said tool holder comprising a gear adapted to be brought into engagement with said return gear on said feed spindle.

8. In a structure of the class described, the combination of an annular rotatably mounted cutter head, driving means for said cutter head, a tool holder mounted on said cutter head for feeding movement and provided with a feed screw having a worm gear threaded thereon, a feed spindle disposed on said cutter head transversely of said feed screw and provided with a worm meshing with said gear on said feed screw and with a feed pinion at one end and a return gear at the other, a feed segment mounted on said frame member to move into and out of position to engage said feed pinion as the cutter head revolves, a shifting means for said feed segment, comprising a tripping member mounted on said cutter head, a detent for said tripping member, said feed screw being adapted to engage said detent, and means for returning said tool holder comprising a gear adapted to be brought into engagement with said return gear on said feed spindle.

9. In a structure of the class described, the combination of an annular rotatably mounted cutter head, driving means for said cutter head, a tool holder mounted on said cutter head for radial feeding movement and provided with a feed screw having a worm gear thereon, a feed spindle disposed on said cutter head transversely of said feed screw and provided with a worm meshing with said gear on said feed screw and with a feed pinion, a feed segment mounted on said frame member to move into and out of position to engage said feed pinion as the cutter head revolves, a shifting means for said feed segment, comprising a tripping member mounted on said cutter head, a detent for said tripping member provided with an adjustable tappet, said feed screw being adapted to engage said tappet, and means for adjusting the tappet on said detent whereby the tripping point of the feed may be adjusted.

10. In a structure of the class described, the combination of an annular rotatably mounted cutter head, driving means for said cutter head, a tool holder mounted on said cutter head for radial feeding movement and provided with a feed screw having a worm gear thereon, a feed spindle disposed on said cutter head transversely of said feed screw and provided with a worm meshing with said gear on said feed screw and with a feed pinion, a feed segment mounted on said frame member to move into and out of position to engage said feed pinion as the cutter head revolves, a shifting means for said feed segment, comprising a tripping member mounted on said cutter head, said tripping member being released by the feeding movement of said tool holder.

11. In a structure of the class described, the combination of an annular rotatably mounted cutter head, means for driving said cutter head, a tool holder mounted on said cutter head, means for feeding said tool holders to the work disposed centrally of said cutter head whereby it is actuated by the rotation of the cutter head, and means for rendering said tool holder feed means inoperative comprising a trip member and a detent therefor, the said detent being provided with an adjustable tappet with which the tool holder coacts to stop the feeding of the tool holder at a predetermined point.

12. In a structure of the class described, the combination of an annular rotatably mounted cutter head, a tool holder mounted on said cutter head for radial feeding movement towards the center of said cutter and provided with a feed screw and a feed gear thereon, means for intermittently driving said feed gear as the cutter head revolves, means for rendering said feed gear driving means inoperative controlled by the feeding movement of the tool holder comprising an adjustable member whereby the point of stopping of the feed may be varied, means for returning the tool holders, and means controlled by the return of the tool holders for returning the feed driving means to operative position.

13. In a structure of the class described, the combination of an annular rotatably mounted cutter head, a tool holder mounted on said cutter head for radial feeding movement towards the center of said cutter and provided with a feed screw and a feed gear thereon, means for intermittently driving said feed gear as the cutter head revolves, and means for rendering said feed gear driving means inoperative controlled by the feeding movement of the tool holder comprising an adjustable member whereby the point of stopping of the feed may be varied.

14. In a structure of the class described, the combination of an annular rotatably mounted cutter head, a tool holder mounted on said cutter head for radial feeding movement towards the center of said cutter and provided with a feed screw and a feed gear thereon, means for intermittently driving said feed gear as the cutter head revolves, means for rendering said feed gear driving means inoperative controlled by the feeding movement of the tool holder, means for returning the tool holders, and means controlled by the return of the tool holders for returning the feed driving means to operative position.

15. In a structure of the class described, the combination of an annular rotatably mounted cutter head, a tool holder mounted on said cutter head for radial feeding movement towards the center of said cutter and provided with a feed screw and a feed gear thereon, means for intermittently driving said feed gear as the cutter head revolves, and means for rendering said feed gear driving means inoperative controlled by the feeding movement of the tool holder.

16. In a structure of the class described, the combination of a rotatably mounted cutter head, means for driving said cutter head, a tool holder mounted on said cutter head for feeding movement, a feed means for said tool holder whereby it is intermittently advanced as the cutter head revolves, means for rendering said feed means inoperative controlled by the feeding movement of the tool holder, comprising an adjustable member whereby the point of the stopping of the feed may be varied, means for returning the tool holder, and means operated by the return of the tool holder for returning the tool holder feed means to operative position.

17. In a structure of the class described, the combination of a rotatably mounted cutter head, means for driving said cutter head, a tool holder mounted on said cutter head for feeding movement, a feed means for said tool holder whereby it is intermittently advanced as the cutter head revolves, and means for rendering said feed means inoperative controlled by the feeding movement of the tool holder, comprising an adjustable member whereby the point of the stopping of the feed may be varied.

18. In a structure of the class described, the combination of a rotatably mounted cutter head, means for driving said cutter head, a tool holder mounted on said cutter head for feeding movement, a feed means for said tool holder whereby it is intermittently advanced as the cutter head revolves, means for rendering said feed means inoperative controlled by the feeding movement of the tool holder, means for returning the tool holder, and means operated by the return of the tool holder for returning the tool holder feed means to operative position.

19. In a structure of the class described, the combination of a rotatably mounted cutter head, means for driving said cutter head, a tool holder mounted on said cutter head for feeding movement, a feed means for said tool holder whereby it is intermittently advanced as the cutter head revolves, and means for rendering said feed means inoperative controlled by the feeding movement of the tool holder.

20. In a structure of the class described, the combination of a bed, a plurality of units mounted on said bed to center with the crank pins of a multi-throw crank shaft, each unit comprising a cutter head frame member provided with an annular cutter head bearing, an annular cutter head in said bearing, having peripheral gear and a radial tool holder way, a tool holder supported in said way and provided with a feed screw and a feed gear thereon, means for intermittently driving said feed gear as the cutter head revolves, means for rendering said feed gear driving means inoperative controlled by the feeding movement of the tool holder and comprising an adjustable member whereby the point of stopping of the feed may be varied, means for returning the several tool holders simultaneously, means controlled by the return of the feed holders for returning the feed driving means to operative position, means for driving said cutter heads comprising gears meshed with the gears of the cutter heads, and means for supporting a crank shaft so that each unit may simultaneously operate upon one of the pins thereof.

21. In a structure of the class described, the combination of a bed, a plurality of units mounted on said bed to center with the crank pins of a multi-throw crank shaft, each unit comprising a cutter head frame member provided with an annular cutter head bearing, an annular cutter head in said bearing, having peripheral gear and a radial tool holder way, a tool holder supported in said way and provided with a feed screw and a feed gear thereon, means for intermittently driving said feed gear as the cutter head revolves, means for driving said cutter heads comprising gears meshed with the gears of the cutter heads, and means for supporting a crank shaft so that each unit may simultaneously operate upon one of the pins thereof.

22. In a structure of the class described, the combination of a bed, a plurality of units mounted on said bed each comprising a cutter head frame member, an annular cutter head rotatably mounted on said frame member, means for driving said cutter head, said units being mounted on said bed so that the cutter head centers with the crank pins of the multi-throw crank shaft, tool holders mounted on said cutter heads, means for feeding said tool holders to the work, comprising feed screws and feed gears thereon, means for driving said feed gears whereby they are driven upon the rotation of the cutter heads, means for rendering said tool holder feed means inoperative comprising a trip member and a detent therefor, the said detent being provided with an adjustable tappet with which the tool holder coacts to stop the feeding of the tool holder at a predetermined point, means for simultaneously returning the tool holders to their initial position, means actuated by such return movement for resetting said feed trip member, and means for supporting a crank shaft so that the units can simultaneously operate upon the crank pin thereof.

23. In a structure of the class described, the combination of a bed, a plurality of units mounted on said bed each comprising a cutter head frame member, an annular cutter head rotatably mounted on said frame member, means for driving said cutter head, said units being mounted on said bed so that the cutter head centers with the crank pins of the multi-throw crank shaft, tool holders mounted on said cutter heads, means for feeding said tool holders to the work driven upon the rotation of the cutter heads, means for rendering said tool holder feed means inoperative comprising a trip member and a detent therefor, the said detent being provided with an adjustable tappet with which the tool holder coacts to stop the feeding of the tool holder at a predetermined point, means for simultaneously returning the tool holders to their initial position, means actuated by such return movement for resetting said feed trip member, and means for supporting a crank shaft so that the units can simultaneously operate upon the crank pin thereof.

24. In a structure of the class described, the combination of a bed, a plurality of units mounted on said bed each comprising a cutter head frame member, an annular cutter head rotatably mounted on said frame member, means for driving said cutter head, said units being mounted on said bed so that the cutter head centers with the crank pins of the multi-throw crank shaft, tool holders mounted on said cutter heads, means for feeding said tool holders to the work, comprising feed screws and feed gears thereon, means for driving said feed gears whereby they are driven upon the rotation of the cutter heads, and means for supporting a crank shaft so that the units can simultaneously operate upon the crank pin thereof.

25. In a structure of the class described, the combination of a bed, a plurality of units mounted on said bed each comprising a cutter head frame member, an annular cutter head rotatably mounted on said frame member, means for driving said cutter head, said units being mounted on said bed so that the cutter head centers with the crank pins of the multi-throw crank shaft, tool holders mounted on said cutter heads, means for feeding said tool holders to the work driven upon the rotation of the cutter heads, means for simultaneously returning the tool holders to their initial position, means actuated by such return movement for resetting said feed trip member, and means for supporting a crank shaft so that the units can simultaneously operate upon the crank pin thereof.

26. In a structure of the class described, the combination of a bed, a plurality of units mounted on said bed each comprising a cutter head frame member, an annular cutter head rotatably mounted on said frame member, means for driving said cutter head, said units being mounted on said bed so that the cutter head centers with the crank pins of the multi-throw crank shaft, tool holders mounted on said cutter heads, means for feeding said tool holders to the work, driven upon the rotation of the cutter heads, and means for supporting a crank shaft so that the units can simultaneously operate upon the crank pin thereof.

27. In a structure of the class described, the combination of a main frame, a plurality of cutter head units comprising annular cutter heads provided with cutters arranged to center with the crank pins of a multi-throw crank shaft, a work holder means comprising supports adapted to receive the bearings of a crank shaft, said supports being pivotally mounted at one end permitting their being swung downward to facilitate the introduction and removal of a crank from the machine, a means for supporting the swinging ends of said work holders, clamps for securing the work in said supports and coacting pairs of work holding clamps arranged to engage the cheek pieces of a crank between the said supports engaging the bearings thereof.

28. In a structure of the class described, the combination of a main frame, a plurality of cutter head units comprising annular cutter heads provided with cutters arranged to center with the crank pins of a multi-throw crank shaft, a work holder means comprising supports adapted to receive the bearings of a crank shaft, clamps for securing the work in said supports and coacting pairs of work holding clamps arranged to engage the cheek pieces of a crank between the said supports engaging the bearings thereof.

29. In a structure of the class described, the combination of a main frame, a plurality of cutter head units comprising annular cutter heads provided with cutters arranged to center with the crank pins of a multi-throw crank shaft, a work holder means comprising supports adapted to receive the bearings of a crank shaft, said supports being pivotally mounted at one end permitting their being swung downward to facilitate the introduction and removal of a crank from the machine, and a means for supporting the swinging ends of said work holders.

30. In a structure of the class described, the combination of a main frame, a plurality of cutter head units comprising annular cutter heads provided with cutters arranged to center with the crank pins of a multi-throw crank shaft, a work holder means comprising supports adapted to receive the bearings of a crank shaft, said supports being adjustably mounted permitting their being swung out of the way to facilitate the introduction and removal of a crank from the machine, and work clamps engaging the cheek pieces of a crank between the said bearing supports.

31. In a structure of the class described, the combination of a main frame, a plurality of cutter head units comprising annular cutter heads provided with cutters arranged to center with the crank pins of a multi-throw crank shaft, a work holder means comprising supports adapted to receive the bearings of a crank shaft, and work clamps engaging the cheek pieces of a crank between the said bearing supports.

32. In a structure of the class described, the combination of a main frame, a plurality of cutter head units comprising annular cutter heads provided with cutters arranged to center with the crank pins of a multi-throw crank shaft, and a work holder means comprising supports adapted to receive the bearings of a crank shaft, said supports being adjustably mounted permitting their being swung out of the way to facilitate the introduction and removal of a crank from the machine.

In witness whereof, I have hereunto set my hand and seal in the presence of two witnesses.

EUGENE HIGGINS. [L. S.]

Witnesses:
MARGARET L. GLASGOW,
LUELLA G. GREENFIELD.